United States Patent [19]

Numata et al.

[11] 4,146,319
[45] Mar. 27, 1979

[54] SINGLE LENS REFLEX CAMERA WITH AUTOMATIC EXPOSURE CONTROL CIRCUIT

[75] Inventors: Saburo Numata; Shinichiro Okazaki, both of Urawa, Japan

[73] Assignee: Fuji Photo Optical Co., Ltd., Omiya, Japan

[21] Appl. No.: 767,072

[22] Filed: Feb. 9, 1977

[30] Foreign Application Priority Data

Feb. 9, 1976 [JP] Japan ................................ 51-12981

[51] Int. Cl.² .............................................. G03B 17/06
[52] U.S. Cl. ..................................... 354/53; 354/60 L
[58] Field of Search ........................ 354/53, 54, 55, 56, 354/60 L, 23 R, 31, 60 R

[56] References Cited

U.S. PATENT DOCUMENTS

| | | | |
|---|---|---|---|
| 3,127,823 | 4/1964 | Babcock et al. | 354/60 L X |
| 3,528,350 | 9/1970 | Schmitt | 354/60 R X |
| 3,860,936 | 1/1975 | Harvey | 354/60 L X |
| 3,955,892 | 5/1976 | Numata et al. | 354/60 L X |
| 3,997,904 | 12/1976 | Schutze et al. | 354/60 L X |
| 4,001,845 | 1/1977 | Maitani et al. | 354/60 L X |

*Primary Examiner*—Michael L. Gellner

[57] ABSTRACT

A single lens reflex camera with an automatic exposure control circuit includes a photodetector and a light emitting indicator in the viewfinder optical system. The light emitting indicator is energized to emit light with high luminance for a predetermined period when the electric power source is turned on in the camera. By the high luminance light emission of the light emitting indicator, the photodetector in the exposure control circuit is preliminarily exposed to light before it starts to measure scene brightness. Thus, the response of the photodetector is enhanced.

4 Claims, 2 Drawing Figures

SINGLE LENS REFLEX CAMERA WITH AUTOMATIC EXPOSURE CONTROL CIRCUIT

BACKGROUND OF THE INVENTION

1. Field of the Invention

This invention relates to a single lens reflex camera with an automatic exposure control circuit, and more particularly to a single lens reflex camera with an automatic exposure control circuit including a light measuring photodetector and an exposure information indicating means provided in a viewfinder optical system of the camera.

2. Description of the Prior Art

It has been known in the art in a camera with an automatic exposure camera to measure the light coming through the taking lens and indicate the results of the measurement in terms of exposure information such as a shutter speed within the field of view of a viewfinder optical system by means of a light emitting indicator composed of light emitting diode elements.

In this type of cameras, a photodetector is provided in a viewfinder optical system to receive light coming through the taking lens by way of a swing-up mirror and a focusing plate.

This type of cameras suffer from the defect that the response of the automatic exposure control circuit is slowed when pictures are successively taken or the scene brightness is low. While the shutter is released, the swing-up mirror is moved up and the light coming through the taking lens of the camera is prevented from impinging upon the photodetector in the viewfinder optical system. Therefore, when the light again impinges upon the photodetector after the shutter operation for the previous exposure is finished, it takes some time for the automatic exposure control circuit including the photodetector to recover its normal level of measurement and output the true value of the scene brightness. Particularly when the pictures are successively taken as in a motor driven camera, the automatic exposure control is not able to follow the fast repeated exposures, and accordingly, correct exposure is not always obtained. Further, when the scene brightness is low, the response of the exposure control circuit including the photodetector is low.

SUMMARY OF THE INVENTION

In view of the above defect inherent in the conventional cameras provided with an automatic exposure control circuit, it is the primary object of the present invention to provide a single lens reflex camera with an automatic exposure control circuit in which the exposure control circuit operates with a high response even when the pictures are successively taken.

It is another object of the present invention to provide a single lens reflex camera with an automatic exposure control circuit in which the exposure control circuit operates with high response even when the scene brightness is low.

The above objects are accomplished by causing a light emitting indicator provided in the viewfinder optical system to emit light with high luminance for a predetermined period, thereby preliminarily exposing the photodetector to light before it starts to measure the scene brightness. The light emitting indicator is energized to emit light with high luminance when the electric power is turned on in the camera.

The light emitting indicator is provided in the viewfinder optical system. In order that the exposure information indicated by the light emitting indicator may be viewed together with the image formed on the focusing plate, the light emitting indicator is generally provided in the vicinity of the focusing plate above the swing-up mirror. On the other hand, the photodetector of the automatic exposure control circuit is provided in the vicinity of the eyepiece of the viewfinder optical system or on one face of a pentagonal dach prism above the focusing plate. Therefore, in the single lens reflex camera provided with the automatic exposure control circuit, the photodetector is able to receive the light emitted by the light emitting indicator. The light emitting indicator is normally composed of a plurality of light emitting diodes.

DESCRIPTION OF THE PREFERRED EMBODIMENT

Figure 1:
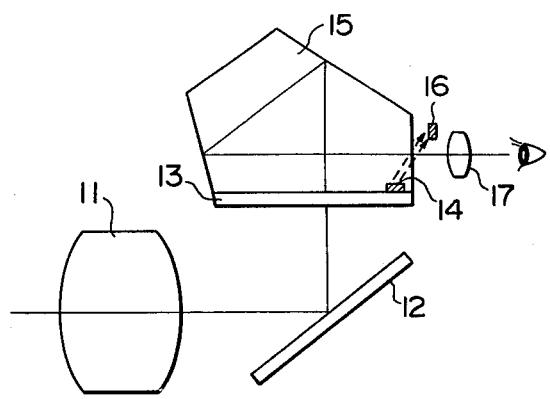
FIG. 1 is a schematic diagram showing the optical system of a single lens reflex camera.

Now referring to FIG. 1 which shows an optical system of a single lens reflex camera, a taking lens 11 is provided in front of a swing-up mirror 12. Above the swing-up mirror 12 is located a focusing plate 13. A Fresnel lens (not shown) is located on the focusing plate 13 to condense light. On a marginal portion of the focusing plate 13 is provided a light emitting indicator 14 composed of a plurality of light emitting diode elements. Above the focusing plate 13 is located a pentagonal dach prism 15 to reflect the light from the focusing plate 13 rearward to an eyepiece 17. A photodetector 16 is provided in the vicinity of the eyepiece 17 to receive the light from the prism 15. The photodetector 16 is located at such a position as to receive light from the light emitting indicator 14.

Figure 2:
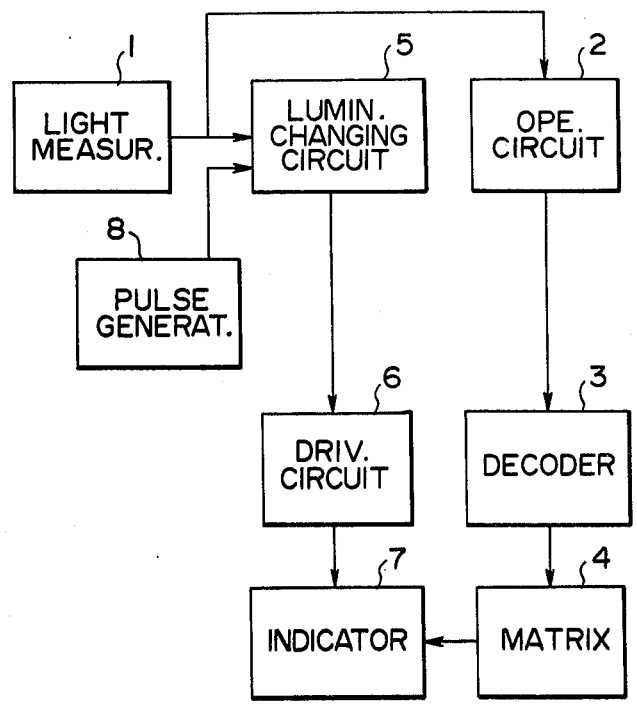
FIG. 2 is a block diagram showing an electric circuit employed in an embodiment of the present invention.

Referring to FIG. 2, a light measuring circuit 1 including said photodetector 16 is connected with an operating circuit 2 and a luminance changing circuit 5. The luminance changing circuit 5 functions as well known in the art to change the emission luminance of the light emitting indicator 14 according to the level of the scene brightness so that the scene may always be viewed clearly and comfortably without being affected by the light emitting indicator 14. The output of the operating circuit 2 is put into an indicating means 7 including said plurality of light emitting diode elements by way of a decoder 3 and a matrix 4. The indicating means 7 corresponds to said light emitting indicator 14 shown in FIG. 1. The output of the operating circuit 2 is a function of the scene brightness measured by the light measuring circuit 1 and is indicative of the exposure information to be indicated by the light emitting indicator 14 such as a shutter speed which is automatically controlled by an automatic exposure control circuit (not shown) provided in the camera. The output of the operating circuit 2 is put into a shutter speed control circuit or an aperture control circuit (not shown) to obtain the optimum exposure with respect to the scene brightness.

The output of the luminance changing circuit 5 is put into a drive circuit 6 which controls the luminance of the indicating means 7 by means of electric potential or current.

A pulse generator 8 is further connected with the luminance changing circuit 5 to supply a pulse having a predetermined width to the input of the luminance changing circuit 5. The pulse generator 8 is reset for instance upon the first stage of depression of a shutter release button. When the pulse generator 8 is reset, a pulse having a predetermined width is added to the output of the light measuring circuit 1, which results in energization of the light emitting indicator 14 with high luminance for a predetermined period. By the energization of the light emitting indicator 14, the photodetector 16 in the viewfinder optical system of the camera is preliminarily exposed so that the response thereof is enhanced.

In operation of the single lens reflex camera as described hereinabove, the electric power is turned on upon first stage of depression of a shutter release button and the pulse generator 8 is reset to supply a pulse having a predetermined width to the luminance changing circuit 5. Therefore, the indicating means 7 or the light emitting indicator 14 emits light with high luminance for a predetermined period to preliminarily expose the photodetector 16 to light. Thus, the response of the photodetector 16 is enhanced before it is used to measure the scene brightness. When the pulse falls, the luminance changing circuit 5 starts to be only supplied with the output of the light measuring circuit 1. Said predetermined period during which the light emitting indicator 14 is energized with high luminance and the photodetector 16 is preliminarily exposed is desired to be several milliseconds. The response of the photodetector 16 is enhanced to several tens of times as high as that of the photodetector which is not preliminarily exposed to light of high luminance.

We claim:

1. A single lens reflex camera with an automatic exposure control circuit wherein exposure is controlled by the output of a light measuring circuit including a photodetector provided in a viewfinder optical system and the controlled exposure is indicated in the viewfinder by means of a light emitting indicator, wherein the improvement comprises means provided for energizing said light emitting indicator to initally cause the same to emit light with high luminance regardless of scene brightness for a predetermined period when the electric power source for the exposure control circuit is turned on and thereafter cause the same to emit light with luminance determined according to scene brightness, whereby said photodetector is always preliminarily exposed to light upon turning on of the power source.

2. A single lens reflex camera with an automatic exposure control circuit according to claim 1 wherein a luminance changing circuit is connected with the light emitting indicator and a pulse generator which is reset upon turning on of the power source is connected with a luminance changing circuit to supply a pulse of a predetermined width thereto to cause the light emitting indicator to emit light with high luminance for a predetermined period.

3. A single lens reflex camera with an automatic exposure control circuit according to claim 2 wherein said predetermined period is several milliseconds.

4. A single lens reflex camera with an automatic exposure control circuit according to claim 2 wherein said luminance changing circuit is connected with the output of the light measuring circuit so that the luminance changing circuit controls the luminance of the light emitting indicator according to the scene brightness measured by the light measuring circuit.

* * * * *